US012221559B2

(12) United States Patent
De Filippis et al.

(10) Patent No.: US 12,221,559 B2
(45) Date of Patent: Feb. 11, 2025

(54) WATER-BASED PRESSURE SENSITIVE ADHESIVE COMPOSITIONS AND METHODS OF MAKING SAME

(71) Applicants: Rohm and Haas Company, Collegeville, PA (US); Dow Global Technologies LLC, Midland, MI (US)

(72) Inventors: Mario De Filippis, Shanghai (CN); Miao Yang, Valbonne (FR); Cathie Seyfried, Shanghai (CN); Zhaohui Qu, Valbonne (FR); Isabelle Uhl, Valbonne (FR); Melinda L. Einsla, Royersford, PA (US); Kalyan Sehanobish, Sanford, MI (US); William B. Griffith, Jr., North Wales, PA (US); Vinita Yadav, Royersford, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 212 days.

(21) Appl. No.: 16/493,829

(22) PCT Filed: Mar. 13, 2017

(86) PCT No.: PCT/CN2017/076467
§ 371 (c)(1),
(2) Date: Sep. 13, 2019

(87) PCT Pub. No.: WO2018/165827
PCT Pub. Date: Sep. 20, 2018

(65) Prior Publication Data
US 2020/0079979 A1    Mar. 12, 2020

(51) Int. Cl.
| C09J 133/08 | (2006.01) |
| C08F 220/18 | (2006.01) |
| C09J 7/38 | (2018.01) |
| C09J 11/06 | (2006.01) |

(52) U.S. Cl.
CPC ....... *C09J 133/08* (2013.01); *C08F 220/1808* (2020.02); *C09J 7/385* (2018.01); *C09J 11/06* (2013.01); *C08F 220/1802* (2020.02); *C09J 2301/414* (2020.08); *C09J 2423/04* (2013.01); *C09J 2433/00* (2013.01)

(58) Field of Classification Search
CPC . C09J 7/385; C09J 133/02; C09J 11/06; C09J 133/08; C09J 2423/04; C09J 2433/00; C09J 2301/414; C08L 23/02; C08L 33/08; C08L 23/0869; C08L 33/02; C08K 5/54; C08F 220/18; C08F 220/1808; C08F 220/14; C08F 220/06; C08F 212/08
See application file for complete search history.

(56) References Cited

U.S. PATENT DOCUMENTS

| 6,927,267 | B1 * | 8/2005 | Varela de la Rosa ....................... C08F 220/12 526/287 |
| 10,160,891 | B2 | 12/2018 | Dodge et al. |
| 2009/0186221 | A1 * | 7/2009 | Yatagai ....................... C09J 7/38 428/355 AC |
| 2011/0313093 | A1 | 12/2011 | Li et al. |
| 2013/0048221 | A1 * | 2/2013 | Blackwell .................. C09J 7/38 526/329 |
| 2013/0202885 | A1 | 8/2013 | Dodge et al. |
| 2014/0120338 | A1 | 5/2014 | Griffith, Jr. |
| 2016/0326402 | A1 * | 11/2016 | Akizuki ............... G02B 5/3033 |
| 2017/0009111 | A1 | 1/2017 | Bauer et al. |

FOREIGN PATENT DOCUMENTS

| CN | 101372607 B | 6/2010 |
| JP | H02212542 A | 8/1990 |
| JP | 2012-116986 A | 6/2012 |
| JP | 2012126789 A * | 7/2012 |
| WO | 1996005248 A1 | 2/1996 |
| WO | 2005049754 A1 | 6/2005 |
| WO | 2012156072 A1 | 11/2012 |
| WO | 2015051526 A1 | 4/2015 |

OTHER PUBLICATIONS

English language machine translation of JP 2012126789. (Year: 2012).*
PCT/CN2017/076467, International Search Report and Written Opinion with a mailing date of Dec. 12, 2017.
PCT/CN2017/076467, International Preliminary Report on Patentability with a issuance date of Sep. 17, 2019.

* cited by examiner

*Primary Examiner* — Angela C Scott
(74) *Attorney, Agent, or Firm* — Boyle Fredrickson, S.C.

(57) ABSTRACT

Water-based pressure sensitive adhesive compositions are disclosed comprising (a) an acrylic emulsion having a glass transition temperature of less than or equal to 20° C., (b) optionally, a dispersant or a silane-containing compound, and (c) an ethylene or propylene copolymer emulsion. In some embodiments, (a) comprises from 75 to 99 wt % of the compositions, (b), when present, comprises from 0.1 to 5 wt % of the compositions, and (c) comprises from 0.1 to 25 wt % of the composition, each based on the dry weight of the compositions. Methods for preparing water-based pressure sensitive adhesive compositions are also disclosed comprising emulsion polymerizing at least one unsaturated monomer, thereby forming an emulsion polymer having a glass transition temperature of less than or equal to −10° C. and blending the emulsion polymer together with a dispersant or silane-containing compound and an ethylene or propylene copolymer emulsion. Water-based pressure sensitive adhesives and pressure sensitive adhesive films are also disclosed.

18 Claims, No Drawings

WATER-BASED PRESSURE SENSITIVE ADHESIVE COMPOSITIONS AND METHODS OF MAKING SAME

FIELD OF THE DISCLOSURE

The instant disclosure relates to pressure sensitive adhesive compositions. More particularly, the disclosure relates to water-based pressure sensitive adhesive compositions with improved adhesion and/or cohesion, and methods of making the same.

BACKGROUND AND SUMMARY OF THE DISCLOSURE

Adhesive compositions are useful for a wide variety of purposes. One particularly useful subset of adhesive compositions is water-based pressure sensitive adhesives. The use of water-based pressure sensitive adhesives in different end-use applications is generally known. For instance, water-based pressure sensitive adhesives can be used with labels, notepads, tapes, decals, bandages, decorative and protective sheets, and a wide variety of other products. As used in the art, the term "pressure sensitive adhesive" designates a material comprising one or more polymer compositions which, when dried, is aggressively and permanently tacky at room temperature. Further, the term "water-based" indicates that the pressure sensitive adhesive is manufactured with an aqueous carrier. A typical water-based pressure sensitive adhesive will firmly adhere to a variety of dissimilar surfaces upon mere contact without the need of more than finger or hand-applied pressure.

Two properties recognized by the pressure sensitive adhesives industry are the adhesion (e.g., initial tack to a surface or adhesive force after a certain dwell time) and the cohesion (e.g., resistance to shear) of these polymer compositions. Attempts to improve the adhesive properties of pressure sensitive adhesives, such as by the addition of a tackifier to increase the glass transition temperature and decrease the modulus of the polymer composition, tend to reduce the resistance to shear, thereby promoting shear failure. The adhesive properties of water-based pressure sensitive adhesives are particularly important when the adhesive is to be used on low surface energy materials, such as a polyolefin surface.

Therefore, water-based pressure sensitive adhesive compositions with improved adhesion and/or cohesion, and methods of making same, are desirable.

Water-based pressure sensitive adhesive compositions are disclosed comprising (a) an acrylic emulsion having a glass transition temperature of less than or equal to 20° C., (b) optionally a dispersant or a silane-containing compound, and (c) an ethylene or propylene copolymer emulsion. In some embodiments, (a) comprises from 75 to 99 wt % of the compositions, (b), when present, comprises from 0.1 to 5 wt % of the compositions, and (c) comprises from 0.1 to 25 wt % of the composition, each based on the dry weight of the compositions.

Further, water-based pressure sensitive adhesive compositions are disclosed comprising (a) an acrylic emulsion having a glass transition temperature of less than or equal to −10° C. and (b) an ethylene or propylene copolymer emulsion. In some embodiments, (a) comprises from 75 to 99 wt % of the compositions, (b) comprises from 0.1 to 25 wt % of the composition, each based on the dry weight of the compositions.

Methods for preparing water-based pressure sensitive adhesive compositions are also disclosed. In some embodiments, the methods comprise emulsion polymerizing at least one unsaturated monomer, thereby forming an emulsion polymer having a glass transition temperature of less than or equal to −10° C., and blending the emulsion polymer together with a dispersant or a silane-containing compound, and an ethylene or propylene copolymer emulsion. Alternatively, the emulsion polymer may contain as one of the unsaturated monomers, an unsaturated monomer containing a silane moiety, forming a silane-containing emulsion polymer which is blended together with an ethylene or propylene copolymer emulsion.

A water-based pressure sensitive adhesive is disclosed comprising the composition prepared according to the method above is also disclosed. A pressure sensitive adhesive film is also disclosed comprising a water-based pressure sensitive adhesive composition.

DETAILED DESCRIPTION OF THE DISCLOSURE

The instant disclosure relates to water-based pressure sensitive adhesive compositions with improved adhesion and/or cohesion, and methods of making same. In some embodiments, the water-based pressure sensitive adhesive compositions comprise (a) an acrylic emulsion having a glass transition temperature of less than or equal to 20° C., (b) optionally, a dispersant or a silane-containing compound, and (c) an ethylene or propylene copolymer emulsion.

Acrylic Emulsion

In some embodiments, an unsaturated monomer is dispersed throughout an aqueous medium together with a surfactant, thereby forming an emulsified mixture. The surfactant acts as an emulsifier and enables droplets of the unsaturated monomer, which is hydrophobic, to form throughout the aqueous medium. An initiator is then introduced into the emulsified mixture. The initiator reacts with the unsaturated monomer dispersed throughout the aqueous medium until all or substantially all of the unsaturated monomer is polymerized. The end result is an acrylic emulsion comprising a dispersion of polymer particles in the aqueous medium, the polymer particles comprising the monomer subunits.

In some embodiments, the acrylic emulsion accounts for from 75 to 99 percent by weight, or from 85 to 99 percent by weight, or from 90 to 99 percent by weight, or from 95 to 99 percent by weight of the water-based pressure sensitive adhesive composition, based on the total weight of the adhesive composition. In some embodiments, the acrylic emulsion has a glass transition temperature ("Tg") of less than or equal to −10° C. as measured by Differential Scanning calorimeter with heating rate of 10° C./min. In some embodiments, the Tg of the acrylic emulsion is from −70 to −10° C., or from −60 to −20° C., or from −50 to −30° C.

Examples of unsaturated monomers include, but are not limited to, acrylic acid, derivatives of acrylic acid such as acrylates including, but not limited to, butyl acrylate, ethylhexyl acrylate, ethyl acrylate, methyl acrylate, octyl acrylate, isooctyl acrylate, decyl acrylate, isodecyl acrylate, lauryl acrylate, cyclohexyl acrylate, methacrylates including, but not limited to, methyl methacrylate, isobutyl methacrylate, octyl methacrylate, isooctyl methacrylate, decyl methacrylate, isodecyl methacrylate, lauryl methacrylate, pentadecyl methacrylate, stearyl methacrylate, $C_{12}$ to $C_{18}$ alkyl methacrylates, cyclohexyl methacrylate, styrene, vinyl esters, methacrylic acid, and combinations thereof.

Examples of the surfactants include, but are not limited to, cationic surfactants, anionic surfactants, zwitterionic surfactants, non-ionic surfactants, and combinations thereof. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants, such as ethoxylated alcohol, ethoxylated fatty acid, sorbitan derivative, lanolin derivative, ethoxylated nonyl phenol, or alkoxylated polysiloxane. Commercially-available examples of suitable surfactants include, but are not limited to, surfactants sold under the trade name AEROSOL™ by Cytec Solvay Group, such as AEROSOL™ A-102, and products sold under the RHODACAL™ trade name by Cytec Solvay Group, such as RHODACAL™ DS-4.

In some embodiments, the initiator can be either a thermal initiator or a redox system initiator. One example of the thermal initiator includes, but is not limited to, ammonium persulfate. Where the initiator is a redox system initiator, the reducing agent can be, for example, an ascorbic acid, a sulfoxylate, or an erythorbic acid, while the oxidating agent can be, for example, a peroxide or a persulfate.

Dispersant

In some embodiments, the water-based pressure sensitive adhesive compositions comprise a dispersant. In some embodiments, the dispersant accounts for from 0 to 5 percent by weight, or from 0.1 to 5 percent by weight, or from 0.1 to 3 percent by weight, or from 0.1 to 1 percent by weight of the water-based pressure sensitive adhesive composition, based on the total weight of the adhesive composition. In some embodiments, the dispersant is a pigment dispersant, most preferably a hydrophobic copolymer polyelectrolyte pigment dispersant. Commercially available examples of suitable dispersants include, but are not limited to, products sold under the trade name OROTAN™ by The Dow Chemical Company, such as OROTAN™ 165, and TAMOL™ by The Dow Chemical Company.

Silane-Containing Compound

In some embodiments, the water-based pressure sensitive adhesive compositions comprise a silane-containing compound. In some embodiments, the silane-containing compound accounts for from 0 to 5 percent by weight, or from 0.1 to 5 percent by weight, or from 0.1 to 3 percent by weight, or from 0.1 to 1 percent by weight of the water-based pressure sensitive adhesive composition, based on the total weight of the adhesive composition. In some embodiments, the silane-containing compound includes 3-glycidoxypropylmethyldiethoxysilane. Examples of unsaturated monomers containing a silane moiety include but are not limited to vinyl trimethoxysilane and 3-(trimethoxysilyl)propyl methacrylate.

Commercially available examples of suitable silane-containing compounds include, but are not limited to, products sold under the trade name COATOSIL™ by Momentive Performance Materials, such as COATOSIL™ 2287.

Ethylene or Propylene Copolymer Emulsion

In some embodiments, the water-based pressure sensitive adhesive compositions comprise an ethylene or propylene copolymer emulsion. In some embodiments, the ethylene or propylene copolymer emulsion accounts for from 0.1 to 25 percent by weight, or from 0.1 to 5 percent by weight, or from 1 to 4 percent by weight, or from 2 to 3 percent by weight of the water-based pressure sensitive adhesive composition, based on the total weight of the adhesive composition.

In some embodiments, the ethylene or propylene copolymer emulsion is selected from the group consisting of ethylene acrylic acid copolymers ("EAA"), ethylene methacrylic acid copolymers ("EMAA"), ethylene maleic anhydride copolymers ("EMAH"), propylene maleic anhydride copolymers ("PMAH"), propylene acrylic acid copolymers ("PAA"), ethylene propylene copolymers with maleic anhydride or acid functional groups ("EPMAH" or "EPAA"), olefinic ionomer resins such as ethylene ionomers, and combinations of two or more thereof. In some embodiments, the ethylene or propylene copolymer emulsion is only EAA copolymer.

Commercially available examples of suitable ethylene or propylene copolymer emulsions include, but are not limited to, products sold under the trade name COHESA™ by Honeywell International, Inc., such as COHESA™ 3050 emulsion.

Pressure Sensitive Adhesive Compositions

In some embodiments, the water-based pressure sensitive adhesive compositions comprise an acrylic emulsion having a glass transition temperature of less than or equal to −10° C., a dispersant, and an ethylene or propylene copolymer emulsion. In some embodiments, the pressure sensitive adhesive compositions comprise an acrylic emulsion having a glass transition temperature of less than or equal to −10° C., a silane-containing compound, and an ethylene or propylene copolymer emulsion. In some embodiments, the pressure sensitive adhesive compositions comprise an acrylic emulsion having a glass transition temperature of less than or equal to −10° C. and an ethylene or propylene copolymer emulsion. In some embodiments, the water-based pressure sensitive adhesive compositions comprise an acrylic emulsion comprising at least one selected from the group consisting of 2-ethylhexyl acrylate ("2-EHA"), methyl methacrylate ("MMA"), butyl acrylate ("BA"), ethyl acrylate ("EA"), methyl acrylate ("MA"), styrene ("STY"), acrylic acid ("AA"), a dispersant or a silane-containing compound, and an ethylene acrylic acid copolymer emulsion. In some embodiments, the acrylic emulsion is prepared first and then blended with at least one of a dispersant, a silane-containing compound, and an ethylene or propylene copolymer emulsion.

In some embodiments, the water-based pressure sensitive adhesive composition may further include, optionally, one or more additives. Examples of the one or more additives include, but are not limited to, a thickener, a defoamer, a wetting agent, a mechanical stabilizer, a pigment, a filler, a freeze-thaw agent, a neutralizing agent, a plasticizer, a tackifier, an adhesion promoter, a crosslinker (inter or intramolecular), and combinations thereof.

The water-based pressure sensitive adhesive composition may comprise 0 to 5 percent by weight of a thickener, based on the total weight of the adhesive composition. All individual values and subranges from 0 to 5 percent by weight are included herein and disclosed herein. For example, the wt % of the neutralizing agent can be from a lower limit of 0, 0.5, or 1 percent by weight to an upper limit of 1, 3, or 5 percent by weight. Example thickeners include, but are not limited to, ACRYSOL™, UCAR™ and CELOSIZE™ which are commercially available from The Dow Chemical Company, Midland, Michigan.

The water-based pressure sensitive adhesive composition may comprise 0 to 2 percent by weight of a neutralizing agent, based on the total weight of the adhesive composition.

All individual values and subranges from 0 to 2 percent by weight are included herein and disclosed herein. For example, the wt % of the neutralizing agent can be from a lower limit of 0, 0.3, or 0.5 percent by weight to an upper limit of 0.5, 1, or 2 percent by weight. Neutralizing agents are typically used to control pH to provide stability to the formulated pressure sensitive adhesive composition. Examples of the neutralizing agent include, but are not limited to, aqueous ammonia, aqueous amines, and other aqueous inorganic salts.

The water-based pressure sensitive adhesive composition may comprise less than 50 percent by weight of a tackifier, based on the total weight of the adhesive composition. All individual values and subranges from less than 50 percent by weight are included herein and disclosed herein. For example, the content of the tackifier can be from a lower limit of 0, 0.1, 0.2, 0.3, 0.5, 1, 2, 3, 4, or 5 percent by weight to an upper limit of 10, 20, 30, 40, or 50 percent by weight. Examples of the tackifier include, but are not limited to, rosin resins including rosin acid and/or rosin ester obtained by esterifying rosin acid with alcohols or an epoxy compound and/or its mixture, non-hydrogenated aliphatic $C_5$ resins, hydrogenated aliphatic $C_5$ resins, aromatic modified $C_5$ resins, terpene resins, hydrogenated $C_9$ resins, and combinations thereof.

The water-based pressure sensitive adhesive composition may comprise less than 5 percent by weight of an adhesion promoter, based on the total weight of the adhesive composition. All individual values and subranges from less than 5 percent by weight are included herein and disclosed herein. For example, the wt % of the adhesion promoter can be from a lower limit of 0, 0.1, 0.2, 0.3, 0.5, 1, 2, 3, or 4 percent by weight to an upper limit of 0.1, 0.2, 0.3, 0.5, 1, 2, 3, 4, 5 percent by weight.

EXAMPLES OF THE DISCLOSURE

The present disclosure will now be described in further detail by discussing Illustrative Examples and Comparative Examples (collectively "the Examples"). However, the scope of the present disclosure is not, of course, limited to the Illustrative Examples.

Raw Materials: HDPE and Glass Tests

The raw materials identified in Table 1 are used in the compositions of the Examples.

TABLE 1

Raw Materials

| Material | Description | Vendor |
| --- | --- | --- |
| COHESA ™ 3050 | Ethylene acrylic acid ("EAA") copolymer emulsion | Honeywell International, Inc. |
| OROTAN ™ 165A | Pigment dispersant | The Dow Chemical Company |
| COATOSIL ™ 2287 | Silane-containing adhesion promoter | Momentive Performance Materials, Inc. |
| AEROSOL ™ A-102 | Anionic surfactant | Cytec Solvay Group |
| RHODACAL ™ DS-4 | Anionic surfactant | Cytec Solvay Group |
| AEROSOL ™ OT-75 | Anionic surfactant | Cytec Solvay Group |
| BRUGGOLITE ™ FF6 M | Reducing agent | BrüggemannChemical U.S., Inc. |
| SURFYNOL ™ 440 | Nonionic dynamic wetting agent | Air Products |
| ACRYSOL ™ RM-2020 | Rheology modifier/thickener | The Dow Chemical Company |
| Sodium carbonate, ammonium persfulate, tert-butyl hydroperoxide, sodium formaldehyde bisulfite, n-dodecyl mercaptan | Various chemicals | Sinoreagent Company |
| 2-ethylhexyl acrylate ("EHA"), ethyl acrylate ("EA"), methyl methacrylate ("MMA"), acrylic acid ("AA") | Acrylic emulsion monomers | The Dow Chemical Company |

Acrylic Emulsion Polymerization

Acrylic Emulsion 1

Acrylic Emulsion 1, used in the Examples, is prepared according to the following procedure. A four liter, five-neck reactor equipped with a condenser, a mechanical stirrer, a temperature-controlled thermocouple and inlets for initiators and monomers, is fed with 540 g of deionized ("DI") water and heated to 87° C. under a gentle nitrogen flow. In a separate container, a monomer emulsion is prepared by mixing 400 g of DI water, 12 g of AEROSOL™ A-102I, 10 g of RHODACAL™ DS-4, 4 g of sodium carbonate, and 2,024 g of a monomer mixture comprising 71.5 wt % of 2-ethylhexyl acrylate ("2-EHA"), 18.5 wt % of ethyl acrylate ("EA"), 9 wt % of methyl methacrylate ("MMA"), and 1 wt % of acrylic acid ("AA"). Next, a solution of a mixture of 1.3 g of sodium carbonate and 6.8 g of ammonium persulfate ("APS") in 32 g DI water is added into the reactor Immediately after addition of the solution of sodium carbonate and APS, the monomer emulsion is fed into the reactor. The feeding proceeds for 80 minutes. Together with monomer emulsion feed, 1.6 g of n-dodecyl mercaptan ("n-DDM") is fed for the first 20 minutes. 20 g of RHODACAL™ DS-4 was shot in reactor when 40% of the monomer emulsion was fed in. Upon completion of the monomer emulsion addition, the reaction mixture is cooled to 60° C. before gradual addition of a solution of tert-butyl hydroperoxide (70%) ("t-BHP") and 2.8 g of sodium formaldehyde bisulfite in 28 g DI water, via two separate feeds over 25 minutes. Upon completion of the feeds, the reaction is cooled to room temperature. The obtained Acrylic Emulsion 1 is then filtered through 325 mesh filter cloth to prepare the composition for subsequent evaluation work. The obtained Acrylic Emulsion 1 has a glass transition temperature of about −46° C.

Acrylic Emulsion 2

Acrylic Emulsion 2, used in the Examples, is prepared according to the following procedure. A four liter, five-neck reactor equipped with a condenser, a mechanical stirrer, a temperature-controlled thermocouple and inlets for initiators and monomers, is fed with 540 g of deionized ("DI") water and heated to 87° C. under a gentle nitrogen flow. In a separate container, a monomer emulsion is prepared by mixing 400 g of DI water, 12 g of AEROSOL™ A-102, 10 g of RHODACAL™ DS-4, 4 g of sodium carbonate, and 2,024 g of a monomer mixture comprising 71.5 wt % of 2-ethylhexyl acrylate ("2-EHA"), 18.5 wt % of ethyl acrylate ("EA"), 9 wt % of methyl methacrylate ("MMA"), and 1 wt % of acrylic acid ("AA"). Next, a solution of a mixture of 1.3 g of sodium carbonate and 7.5 g of ammonium persulfate ("APS") in 32 g DI water is added into the reactor Immediately after addition of the solution of sodium carbonate and APS, the monomer emulsion is fed into the reactor. The feeding proceeds for 80 minutes. 20 g of RHODACAL™ DS-4 was shot in reactor when 40% of the monomer emulsion was fed in. Upon completion of the monomer emulsion addition, the reaction mixture is cooled to 60° C. before gradual addition of a solution of tert-butyl hydroperoxide (70%) ("t-BHP") and 2.8 g of sodium formaldehyde bisulfite in 28 g DI water, via two separate feeds over 25 minutes. Upon completion of the feeds, the reaction is cooled to room temperature. The obtained Acrylic Emulsion 2 is then filtered through 325 mesh filter cloth to prepare the composition for subsequent evaluation work. The obtained Acrylic Emulsion 2 has a glass transition temperature of about −46° C.

Acrylic Emulsion 3

Acrylic Emulsion 3, used in the Examples, is prepared according to the following procedure. A four liter, five-neck reactor equipped with a condenser, a mechanical stirrer, a temperature-controlled thermocouple and inlets for initiators and monomers, is fed with 540 g of deionized ("DI") water and heated to 87° C. under a gentle nitrogen flow. In a separate container, a monomer emulsion is prepared by mixing 400 g of DI water, 12 g of AEROSOL™ A-102, 10 g of RHODACAL™ DS-4, 4 g of sodium carbonate, and 2,024 g of a monomer mixture comprising 71.5 wt % of 2-ethylhexyl acrylate ("2-EHA"), 18.5 wt % of ethyl acrylate ("EA"), 9 wt % of methyl methacrylate ("MMA"), and 1 wt % of acrylic acid ("AA"). Next, a solution of a mixture of 1.3 g of sodium carbonate and 8.3 g of ammonium persulfate ("APS") in 32 g DI water is added into the reactor Immediately after addition of the solution of sodium carbonate and APS, the monomer emulsion is fed into the reactor. The feeding proceeds for 80 minutes. 20 g of RHODACAL™ DS-4 was shot in reactor when 40% of the monomer emulsion was fed in. Upon completion of the monomer emulsion addition, the reaction mixture is cooled to 60° C. before gradual addition of a solution of tert-butyl hydroperoxide (70%) ("t-BHP") (4.7 g in 23 g DI water) and 2.8 g of sodium formaldehyde bisulfite in 28 g DI water, via two separate feeds over 25 minutes. Upon completion of the feeds, the reaction is cooled to room temperature. The obtained Acrylic Emulsion 3 is then filtered through 325 mesh filter cloth to prepare the composition for subsequent evaluation work. The obtained Acrylic Emulsion 3 has a glass transition temperature of about −41 C.

Acrylic Emulsion 4

Acrylic Emulsion 4, used in the Examples, is prepared according to the following procedure. A four liter, five-neck reactor equipped with a condenser, a mechanical stirrer, a temperature-controlled thermocouple and inlets for initiators and monomers, is fed with 540 g of deionized ("DI") water and heated to 87° C. under a gentle nitrogen flow. In a separate container, a monomer emulsion is prepared by mixing 400 g of DI water, 12 g of AEROSOL™ A-102, 10 g of RHODACAL™ DS-4, 4 g of sodium carbonate, and 2,024 g of a monomer mixture comprising 80.8 wt % of 2-ethylhexyl acrylate ("2-EHA"), 12.3 wt % of methyl methacrylate ("MMA"), 4% of methyl acrylate ("MA"), 1.9 wt % of styrene ("STY"), and 1 wt % of acrylic acid ("AA"). Next, a solution of a mixture of 1.3 g of sodium carbonate and 8.3 g of ammonium persulfate ("APS") in 32 g DI water is added into the reactor. Immediately after addition of the solution of sodium carbonate and APS, the monomer emulsion is fed into the reactor. The feeding proceeds for 80 minutes. 20 g of RHODACAL™ DS-4 was shot in reactor when 40% of the monomer emulsion was fed in. Upon completion of the monomer emulsion addition, the reaction mixture is cooled to 60° C. before gradual addition of a solution of tert-butyl hydroperoxide (70%) ("t-BHP") and 2.8 g of sodium formaldehyde bisulfite in 28 g DI water, via two separate feeds over 25 minutes. Upon completion of the feeds, the reaction is cooled to room temperature. The obtained Acrylic Emulsion 4 is then filtered through 325 mesh filter cloth to prepare the composition for subsequent evaluation work. The obtained Acrylic Emulsion 4 has a glass transition temperature of about −39° C.

Pressure Sensitive Adhesive Formation

In the Examples, the acrylic emulsion (e.g., Acrylic Emulsion 1, Acrylic Emulsion 2, Acrylic Emulsion 3, Acrylic Emulsion 4) is lightly formulated with a wetting agent, such as 0.3% (wet/wet) SURFYNOL™ 440 wetting agent obtained from Air Products, based on total emulsion, to improve wet-out for lab drawdowns unless otherwise specified. The viscosity is then adjusted to about 600 cps (Brookfield, RVDV, 30 rpm, 63 #) using a thickener, such as ACRYSOL™ RM-2020 from The Dow Chemical Company. The final pH of the emulsion is adjusted to 7.0 to 7.5 using ammonia.

The emulsion is blended with a dispersant (e.g., OROTAN™ 165A), a silane-containing compound (e.g., COATOSIL™ 2287), and/or an ethylene or propylene copolymer emulsion (e.g., COHESA™ 3050) according to a dosage level (wet weight based on total weight of emulsion) as indicated in the Tables below under agitation. The acrylic emulsion blended with one or more of the dispersant, silane-containing compound, and ethylene or propylene copolymer emulsion forms the pressure sensitive adhesive composition.

Lab Drawdowns

Polypropylene ("PP") film (60 μm in thickness) is pretreated by corona treatment before lamination. The formulated pressure sensitive adhesive composition is coated to a release liner at a coating weight of 17 g/m$^2$ on dry weight basis and dried at 105° C. for 2 minutes. The PP film is laminated with the pressure sensitive adhesive coated release liner at 40° C. under 40 psi pressure.

Application Tests

Performance testing can be conducted after the adhesive laminate is conditioned in a controlled environment (22 to 24° C., 50 to 60% relative humidity) testing laboratory for at least overnight, and in some instances after as many as 120 hours under 12 kg of weight.

Adhesion/Tack Test: Samples are tested on both glass and high density polyethylene ("HDPE") test plates according to Federation Internationale des fabricants et transformateurs d' Adhésifs et Thermocollants ("FINAT") Test Method No. 9.

Cohesion/Shear Test: FINAT Test Method No. 8 is used for the shear resistance test.

Failure mode is recorded behind the value of the tests: "AF" indicates adhesion failure. "AFB" indicates adhesion failure from the backing, i.e., the release liner. "CF" indicates cohesion failure. "MF" indicates mixture failure.

Illustrative Examples ("IE") and Comparative Examples ("CE") are detailed in the Tables below. Table 2 details the compositions of CE1, IE1, and IE2, with compositions provided in wt %, based on the total weight of the identified raw materials, and the tack and shear performances of the tested Examples. Examples in any single table below were tested side-by-side with other Examples in that same table and, therefore, are comparable to other Examples in that same table. The performance results for IE1 and IE2 are averages of two independent performance tests.

TABLE 2

CE1 to CE3 and IE1 to IE4

| Component | Example | | | | | | |
|---|---|---|---|---|---|---|---|
| | CE1 | CE2 | CE3 | IE1 | IE2 | IE3 | IE4 |
| Acrylic Emulsion 1 (wt %) | 99 | 99.9 | 100 | 98 | 96 | 98.9 | 96.9 |
| OROTAN ™ 165A (wt %) | 1 | | | 1 | 1 | | |
| COATOSIL ™ 2287 (wt %) | | 0.1 | | | | 0.1 | 0.1 |
| COHESA ™ 3050 (wt %) | | | | 1 | 3 | 1 | 3 |
| Glass/90° Peel Adhesion 24 hr (N/in) | 9.5 AF/ 11 AFB | 11 MF/ 12 MF/AFB | 9.5 AF/ 12.5 MF/AFB | 9 AF/11 MF | 11 MF/AFB | 11.0 MF/AFB | 11.0 MF MF/AFB |
| Glass/Shear Resistance 1" × 1"/kg (hr) | 47 CF/MF | 50.0 MF/CF | 40.0 MF/CF | 63 MF/AFB | 69.0 MF/AFB | 81.5 MF/AFB | 90.0 MF/AFB |
| HDPE/90° Peel Adhesion 24 hr (N/in) | 4.5 AF | 4.5 AF | 4.5 AF | 5.0 AF | 5.0 AF | 5.0 AF | 5.5 AF |

As indicated in Table 2, CE1, IE1 and IE2 demonstrated similar 24 hour glass peel performances. However, the HDPE peel of IE1 and IE2 is each better than CE1, but does not show an increase in HDPE peel with increasing amount of COHESA™ 3050. The glass shear performances of IE1 and IE2 are each better than CE1 and demonstrate the effect of increasing COHESA™ 3050.

CE2, IE3 and IE4 demonstrated similar 24 hour glass peel. However, the HDPE peel of IE3 and IE4 is each better than CE2, and increases with increase in COHESA™ 3050. The glass shear performance of IE3 and IE4 are better than CE2, and increase with increase in COHESA™ 3050.

The 24 hour HDPE peel of each of IE1 to IE4 is better than CE3. The glass shear performance of IE1 to IE4 are each better than CE3 upon addition of COHESA™ 3050 in addition to COATOSIL™ 2287 or OROTAN™ 165A.

Table 3 details the compositions of CE4, IE5, and IE6, with compositions provided in wt %, based on the total weight of the identified raw materials, and the tack and shear performances of the tested Examples.

TABLE 3

Formulations CE4 and IE5, IE6

| Component | Example | | |
|---|---|---|---|
| | CE4 | IE5 | IE6 |
| Acrylic Emulsion 2 (wt %) | 99.5 | 98.5 | 96.5 |
| AEROSOL ™ OT-75 (wt %) | 0.5 | 0.5 | 0.5 |
| COHESA ™ 3050 (wt %) | | 1 | 3 |

TABLE 3-continued

Formulations CE4 and IE5, IE6

| Component | Example | | |
|---|---|---|---|
| | CE4 | IE5 | IE6 |
| Glass/90° Peel Adhesion 24 hr (N/in) | 11 AFB/MF | 11.5 MF/AFB | 11.5 MF/AFB |
| Glass/Shear Resistance 1" × 1"/kg (hr) | 50 CF | 78 MF/AFB | 87 MF/AFB |
| HDPE/90° Peel Adhesion 24 hr (N/in) | 3 AF | 4 AF | 4.5 AF |

As indicated in Table 3, IE5 and IE6 exhibited increased glass peel, glass shear, and HDPE peel.

Table 4 details the compositions of CE5, CE6, and IE7 to IE10, with compositions provided in wt %, based on the total weight of the identified raw materials, and the tack and shear performances of the tested Examples.

TABLE 4

Formulations CE5, CE6, and IE7 to IE10

| Component | IE7 | IE8 | CE6 | IE9 | CE7 | IE10 |
|---|---|---|---|---|---|---|
| Acrylic Emulsion 1 (wt %) | | | | | 99.5 | 98.5 |
| Acrlyic Emulsion 2 (wt %) | 98.5 | 96.5 | | | | |
| Acrlyic Emulsion 3 (wt %) | | | 99.5 | 98.5 | | |
| AEROSOL™ OT-75 (wt %) | 0.5 | 0.5 | 0.5 | 0.5 | 0.5 | 0.5 |
| COHESA™ 3050 (wt %) | 1 | 3 | | 1 | | 1 |
| Glass/90° Peel Adhesion 24 hr (N/in) | 10.5 MF/AFB | 10.5 MF/AFB | 11.0 MF/AFB | 11.5 MF/AFB | 11.5 MF/AFB | 10.5 AFB |
| Glass/Shear Resistance 1" × 1"/kg (hr) | >115 | >115 | 86.0 MF | 62.0 MF/AFB | 24.0 MF/AFB | 23.0 MF/AFB |
| HDPE/90° Peel Adhesion 24 hr (N/in) | 4.5 AF | 4.5 AF | 4.0 AF | 5.0 AF | 4.5 AF | 5.0 AF |

As indicated in Table 4, increasing the amount of COHESA™ 3050 in IE8, compared to IE7, had no impact on peel or shear performance. IE9 exhibited increased glass peel and HDPE peel compared to CE6. IE10 exhibited increased HDPE peel performance compared to CE7.

Table 5 details the compositions of CE8, IE11, and IE12, with compositions provided in wt %, based on the total weight of the identified raw materials, and the tack and shear performances of the tested Examples.

TABLE 5

Formulations CE8, IE11, and IE12

| Component | CE8 | IE11 | IE12 |
|---|---|---|---|
| Acrylic Emulsion 4 (wt %) | 99.5 | 98.5 | 96.5 |
| AEROSOL™ OT-75 (wt %) | 0.5 | 0.5 | 0.5 |
| COHESA™ 3050 (wt %) | | 1 | 3 |
| Glass/90° Peel Adhesion 24 hr (N/in) | 12.5 MF | 11.5 MF | 12 MF |
| Glass/Shear Resistance 1" × 1"/kg (hr) | 115 MF/AFB | 100 MF/AFB | 89 MF/AFB |
| HDPE/90° Peel Adhesion 24 hr (N/in) | 4.5 AF | 5 AF | 5 AF |

As indicated in Table 5, IE11 and IE12 exhibited increased HDPE peel adhesion compared to CE8, without significant change in glass peel or shear.

The acrylic emulsion used in the following Examples is commercially available from The Dow Chemical Company under the trade name ROBOND™ PS-7735.

Lab Drawdowns

The formulated adhesive is coated on a release liner at 18 g/m² on dry weight basis and dried at 80° C. for 5 minutes before laminating with paper.

Performance testing can be conducted after the adhesive laminate is conditioned in a controlled environment (22 to 24° C., 50 to 60% relative humidity) testing laboratory overnight.

Adhesion/Tack Test: Samples are tested on both stainless steel and high density polyethylene ("HDPE") test plates according to Federation Internationale des fabricants et transformateurs d' Adhésifs et Thermocollants ("FINAT") Test Method No. 1.

Cohesion/Shear Test: FINAT Test Method No. 8 is used for the shear resistance test on stainless steel plates.

Failure mode is recorded behind the value of the tests: "AF" indicates adhesion failure. "AFB" indicates adhesion failure from the backing, i.e., the release liner. "CF" indicates cohesion failure. "MF" indicates mixture failure.

Table 6 details the compositions of CE9 and IE13, with compositions provided in wt %, based on the total weight of the identified raw materials, and the tack and shear performances of the tested Examples.

TABLE 6

Formulations CE9 and IE13

| Component | CE9 | IE13 |
|---|---|---|
| ROBOND™ PS-7735 (wt %) | 100 | 97 |
| COHESA™ 3050 (wt %) | | 3 |
| SS/90° Peel Adhesion 24 hr (N/in) | 10.9 MF | 10.4 MF |
| SS/Shear Resistance 1" × 1"/kg (hr) (hr) | 20.3 CF | 118.9 CF |
| HDPE/90° Peel Adhesion 24 hr (N/in) | 4.2 AF | 4.4 AF |

As indicated in Table 6, blending COHESA™ 3050 with ROBOND™ PS-7735 significantly increases stainless steel shear compared to CE9, without significant loss of stainless steel or HDPE peel performances.

What is claimed is:

1. A water-based pressure sensitive adhesive composition, comprising:
   (a) an acrylic emulsion comprising polymer particles having a glass transition temperature of less than or equal to −10° C. wherein the polymer particles consist of monomer subunits of acrylic acid, 2-ethylhexyl acrylate, ethyl acrylate, methyl(meth)acrylate and optional styrene;
   (b) an optional hydrophobic copolymer polyelectrolyte; and
   (c) ethylene acrylic acid emulsion.

2. The water-based pressure sensitive adhesive composition of claim 1, wherein (a) comprises from 75 to 99 wt % of the composition, component (b) is present and comprises from 0.1 to 5 wt % of the composition, and (c) comprises from 0.1 to 25 wt % of the composition, each based on the dry weight of the composition.

3. The water-based pressure sensitive adhesive composition of claim 1, wherein the polymer particles of the acrylic emulsion consist of polymerized monomers acrylic acid, ethyl acrylate, 2-ethylhexyl acrylate, and methyl(meth)acrylate.

4. The water-based pressure sensitive adhesive composition of claim 1, wherein the hydrophobic copolymer polyelectrolyte is present and comprises an ammonium salt of a carboxylate polycarboxylic acid.

5. The water-based pressure sensitive adhesive composition of claim 4, wherein the hydrophobic copolymer polyelectrolyte has a Brookfield Viscosity of from 160 to 400 mPa-s.

6. The water-based pressure sensitive adhesive composition of claim 1, wherein the composition is configured for pressure-sensitive adhesion to substrates.

7. The water-based pressure sensitive adhesive composition of claim 1 wherein the hydrophobic copolymer polyelectrolyte is present and comprises a maleic anhydride copolymer.

8. The water-based pressure sensitive adhesive composition of claim 1 further comprising
   (d) an optional surfactant; and
   (a), (b), (c), and (d) amount to 100 wt % of the water-based pressure sensitive adhesive composition.

9. The water-based pressure sensitive adhesive composition of claim 1 wherein the polymer particles consist of monomer subunits of acrylic acid, 2-ethylhexyl acrylate, ethyl acrylate, methyl methacrylate, and styrene.

10. A water-based pressure sensitive adhesive composition, comprising:
    (a) an acrylic emulsion comprising polymer particles having a glass transition temperature of less than or equal to −10° C. wherein the polymer particles consist of monomer subunits of 2-ethylhexyl acrylate, ethyl acrylate, methyl(meth)acrylate, and optional styrene;
    (b) a silane-containing compound;
    (c) an optional hydrophobic copolymer polyelectrolyte; and
    (d) ethylene acrylic acid emulsion.

11. The water-based pressure sensitive adhesive composition of claim 10, wherein (a) comprises from 75 to 99 wt % of the composition, (b) comprises from 0.1 to 1 wt % of the composition, and (d) comprises from 0.1 to 25 wt % of the composition, each based on the dry weight of the composition.

12. The water-based pressure sensitive adhesive composition of claim 10, wherein the polymer particles of the acrylic emulsion consist of polymerized monomers of acrylic acid, ethyl acrylate, 2-ethylhexyl acrylate, and methyl(meth)acrylate.

13. The water-based pressure sensitive adhesive composition of claim 10, wherein the silane-containing compound is 3-glycidoxypropylmethyldiethoxysilane.

14. The water-based pressure sensitive adhesive composition of claim 10, wherein the composition is configured for pressure-sensitive adhesion to substrates.

15. The water-based pressure sensitive adhesive composition of claim 10 wherein the hydrophobic copolymer polyelectrolyte is present and comprises a maleic anhydride copolymer.

16. The water-based pressure sensitive adhesive composition of claim 10 wherein (a), (b), (c), and (d) amount to 100 wt % of the water-based pressure sensitive adhesive composition.

17. The water-based pressure sensitive adhesive composition of claim 10 wherein the polymer particles consist of monomer subunits of acrylic acid, 2-ethylhexyl acrylate, ethyl acrylate, methyl methacrylate, and styrene.

18. A pressure sensitive adhesive film comprising the water-based pressure sensitive adhesive composition of claim 1.

* * * * *